United States Patent [19]

Tramontini

[11] 4,401,254
[45] Aug. 30, 1983

[54] VACUUM BRAZING PROCESS WITH IMPROVED GETTERING

[75] Inventor: Vernon N. Tramontini, Indianapolis, Ind.

[73] Assignee: Stewart-Warner Corporation, Chicago, Ill.

[21] Appl. No.: 191,526

[22] Filed: Sep. 29, 1980

[51] Int. Cl.³ ............................ B23K 1/04; F27B 5/04
[52] U.S. Cl. ................................... 228/217; 266/250; 432/2; 432/249
[58] Field of Search .................. 228/217; 266/250; 432/13, 31, 249

[56] References Cited

U.S. PATENT DOCUMENTS

| | | | |
|---|---|---|---|
| 1,956,818 | 5/1934 | Acre | 228/118 |
| 2,638,426 | 5/1953 | Brace | 143/13.1 |
| 2,747,066 | 5/1956 | Brace | 219/10.43 |
| 2,758,368 | 8/1956 | Ulam | 228/186 |
| 2,943,181 | 6/1960 | Gunow | 228/217 X |
| 3,321,828 | 5/1967 | Miller | 228/217 |
| 3,322,517 | 5/1967 | Miller | 228/217 |
| 3,475,014 | 10/1969 | Frank et al. | 266/250 X |
| 3,554,512 | 1/1971 | Elliott et al. | 432/31 X |
| 3,673,678 | 7/1972 | Moreau et al. | 228/217 X |

Primary Examiner—Kenneth J. Ramsey
Attorney, Agent, or Firm—Augustus Douvas

[57] ABSTRACT

A method of vacuum brazing large assemblies in an enclosed evacuated furnace with brazing material containing a gettering agent in the area of the joints to be formed, including sensing the temperature of the assembly to be brazed adjacent the joints on the exterior surface of the assembly, and shifting an additional quantity of gettering agent from a cool zone into a hot zone in the furnace as the surface temperature of the assembly approaches the brazing temperature. A furnace adapted to carry out this method is also disclosed.

14 Claims, 11 Drawing Figures

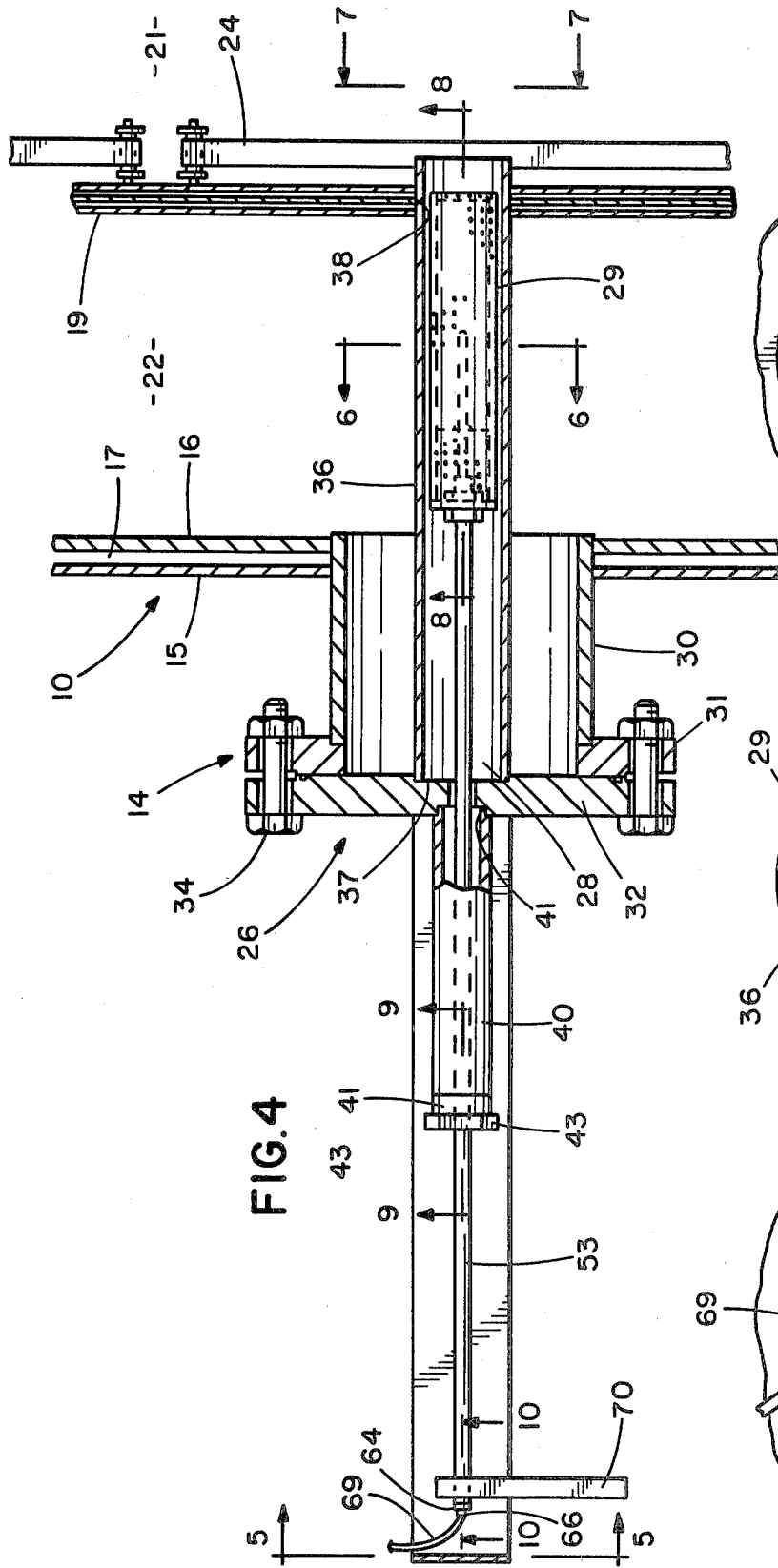
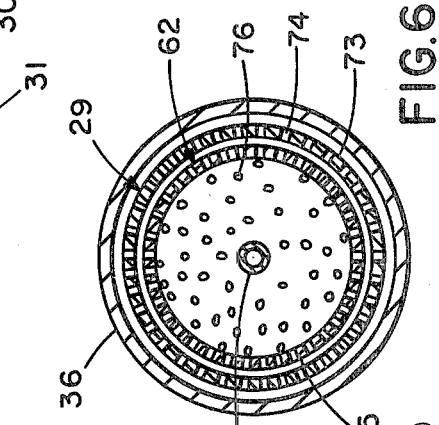
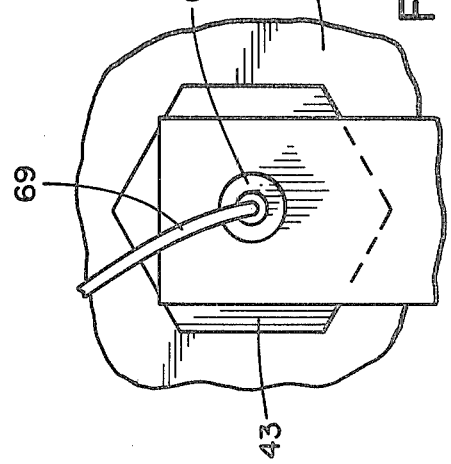

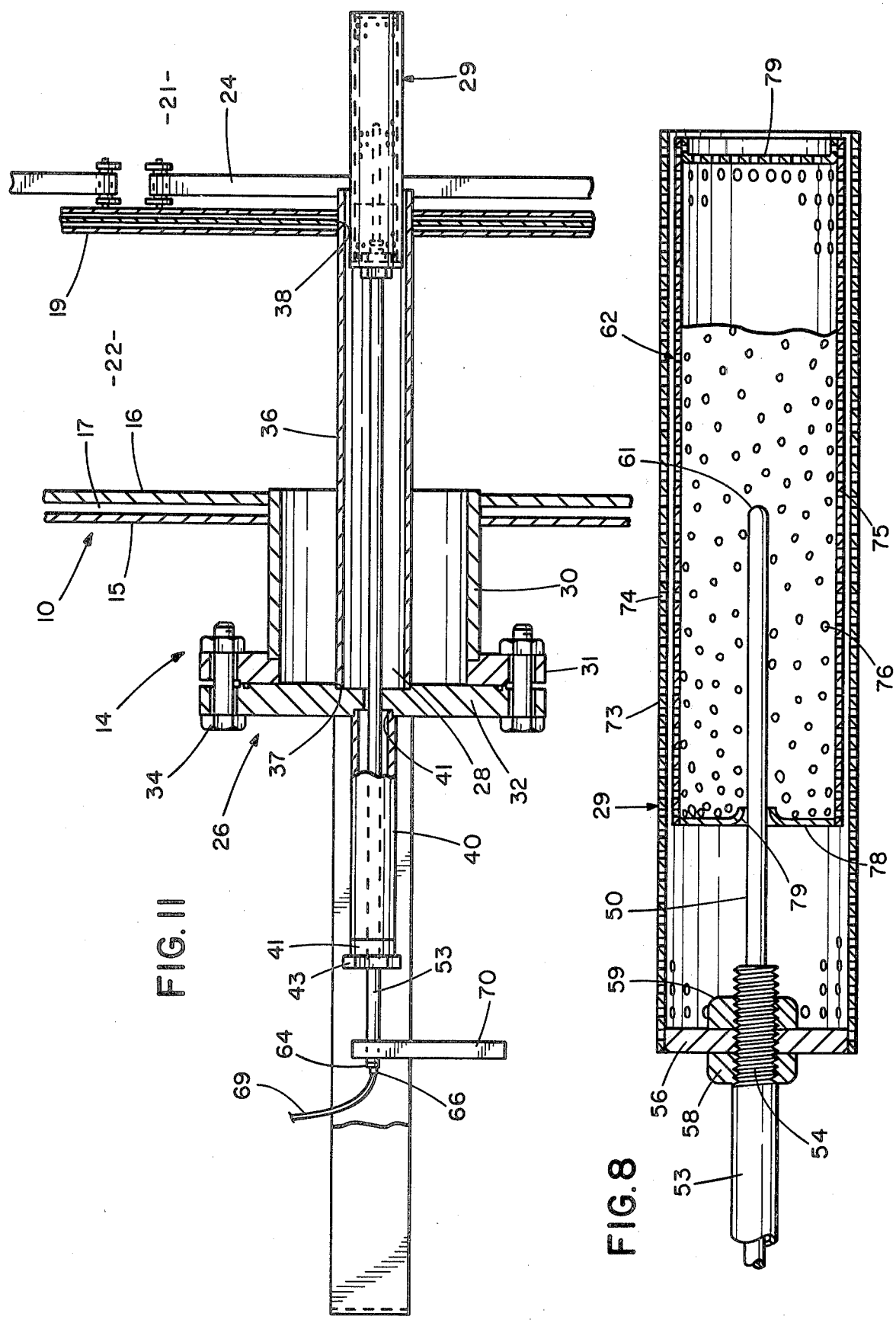

VACUUM BRAZING PROCESS WITH IMPROVED GETTERING

BACKGROUND OF THE PRESENT INVENTION

Vacuum brazing with a brazing material adjacent the joints to be formed and sufficient heat results in the capillary flow of the brazing material into the joints in a similar fashion to conventional atmospheric brazing.

Many base metals such as aluminum are difficult to braze but can be brazed satisfactorily using vacuum brazing processes. These difficult to braze metals and their alloys inhibit the wetting and flowing of brazing alloy under ordinary conditions and usually require special procedures employing fluxes in order to accomplish satisfactory joints.

Aluminum and other difficult to braze metals form surface compounds both prior to and as the metals reach the brazing temperature which detract from and are incompatible with the bonding or brazing alloy. These surface compounds include oxides of the metals which particularly inhibit wetting by the brazing material. Therefore, the prevention of this oxidation or the removal of the formed oxides is necessary for the production of satisfactory joints in these difficult to braze metals and for many years fluxing of the surface of the metals was thought necessary to remove these formed oxides.

It has been found, however, that the use of the flux can be eliminated in some cases in the brazing of difficult to braze metals, such as by the use of a reducing atmosphere such as hydrogen. However, this brazing process has not been very successful due to the difficulty and expense in obtaining the free flow of the reducing gas throughout the structure which is to be brazed.

In vacuum brazing, most of the surface oxides are cracked and displaced by molten filler metal under the high temperature and extremely low pressure conditions employed. Thus, some of the oxides are disassociated from the metals under normal vacuum brazing conditions by vaporization.

It has been found that in the vacuum brazing of aluminum, for example, and particularly in the vacuum brazing of aluminum assemblies with an aluminum-silicon braze alloy, that the addition of magnesium to the brazing alloy aids gettering the furnace envelope and possibly promotes alloy wetting and brazing. While the complete role of magnesium is not completely understood, it is known that the presence of magnesium vapor acts to beneficiate or "getter" the vacuum by reaction with the oxygen and water vapor present at all times, to some extent, in all practical vacuum brazing furnaces.

In the usual case, a small quantity of magnesium, i.e. about one percent, is added to the aluminum-silicon braze alloy so that prior to and during the melting and flow of the braze alloy, magnesium vapor is released to getter the atmosphere in the region of the brazement and in fact the whole of the vacuum chamber, depending upon the chamber size and amount of magnesium vaporized. The vaporization of the magnesium appears not only to assist in eliminating the requirement for any flux, but also possibly permits the use of a somewhat higher pressure during the brazing operation.

To achieve these beneficiating effects from the magnesium vapor, the quantity and timing of the vaporization thereof must be controlled. In the vacuum brazing of smaller assemblies, such as air conditioning evaporators, there is generally a considerable excess of magnesium released and the resulting vacuum beneficiation adequately promotes alloy flow and wetting to easily form fillets in the joints of adequate size and strength. In these small assemblies, the entire unit approaches brazing temperature at the same time and hence the release of magnesium vapor occurs throughout the assembly at all joints at about the same time.

However, the control of magnesium vaporization in very large brazed aluminum industrial heat exchangers has been found to be quite difficult. Because these assemblies consist of large relatively dense arrays of plates, fins and side bars having very few external openings, the rate of heating by radiation through the exchanger is quite slow so that the exterior surfaces of the assembly approach brazing temperature well ahead of the internal joints in the assembly. The tightly stacked side bars and plates on the exterior of one of these large assemblies present only a small amount of brazing alloy directly to the furnace interior since the brazing alloy is commonly formed in brazing alloy sheets pre-assembled directly in the exchangers. Thus, during brazing of these large assemblies the exterior joints and their fillets are formed significantly before the interior-most joints in the assembly. The result of this differentially timed brazing is that during the early critical portion of the brazing cycle when the exterior joints are being brazed, there is a lack of beneficiating magnesium vaporized because only the surface joint magnesium is vaporized at this time, and this results in a poor quality of brazing of the exterior joints. This poor quality is believed to result from this rather small quantity of magnesium attempting to "getter" the entire relatively large furnace volume so that no magnesium or relatively little is available to beneficiate the area of the joints and reduce the formations of oxides at the joints and promote alloy wetting when the brazing temperature has been reached.

It is a primary object of the present invention to ameliorate the above noted problems in the vacuum brazing of certain base metals in large assemblies in the presence of a brazing alloy containing a gettering agent.

SUMMARY OF THE PRESENT INVENTION

In accordance with the present invention, a vacuum brazing process and apparatus are provided for the vacuum bearing of large assemblies of certain metals in the presence of a brazing alloy containing a gettering agent in which additional gettering agent, apart from the gettering agent in the brazing alloy, is introduced into the vacuum chamber during the critical period when the exterior portions of the assembly approach brazing temperature to insure complete "gettering" of the furnace atmosphere and also the adequate promotion of alloy wetting when alloy melting occurs on the external joints of the assembly.

The present method is described herein in connection with the brazing of a large aluminum plate and fin heat exchanger but it should be understood that the invention may be applied to the brazing of other large aluminum assemblies and possibly large assemblies of other difficult to braze metals. The aluminum plate and fin heat exchange core is initially positioned in a hot zone (when cool) of a furnace with a brazing alloy of aluminum-silicon in the form of sheets assembled directly adjacent the joints to be brazed. The brazing alloy contains a gettering agent in the exemplary embodiment of about one percent magnesium which vaporizes during the melting and flow of the brazing alloy. In large assemblies the amount of magnesium vaporized from the braze alloy as the temperature of the external joints approaches the brazing temperature is by itself insufficient to getter the furnace volume, i.e. insufficient to consume or combine with the residual oxygen in the furnace and water vapor, and therefore also insufficient to assist in promoting wetting and flow in the area of the joints to be brazed. The furnace is initially evacuated and the temperature of the hot zone is raised toward the brazing temperature of the surface of the core. A plurality of thermocouples are placed about the exterior of the core of the heat exchanger as well as at several internal locations in the core so that the external and internal temperatures are continuously monitored during the heating phase of the brazing process.

The additional gettering agent, which is magnesium, is injected within the furnace from a relatively cool zone to a hot zone by a mechanical magnesium injector assembly having a cylindrical cartridge that holds a predetermined quantity of magnesium chips. This cartridge has a thermocouple in situ for monitoring the temperature of the chips to indicate when the sublimation of the magnesium from a solid to a vapor occurs, which progresses gradually from the surface of the chips at a constant temperature of about 950 degrees Fahrenheit.

When the surface temperatures of the core reach about 1020 degrees Fahrenheit as indicated by the signals from the thermocouples about the core exterior, the operator activates the mechanical magnesium injector for movement from the cool zone onto the hot zone. The amount of magnesium vapor introduced by the injector is controlled by the operator by the time of in situ positioning of the injector cartridge within the hot zone. When sufficient vaporization has occurred, the operator withdraws the gettering agent cartridge from the hot zone to the relatively cool zone which is significantly below the vaporization temperature of the magnesium gettering agent. The additional magnesium in the injector assures complete gettering, not only of the furnace volume, but also improves the area of the external joints and produces dramatically improved quality in the external joints of large assemblies.

The furnace for carrying out the above brazing method is a large "walk-in" type cold outer wall furnace that has a plurality of metal heat shields spaced several feet from the outer wall of the furnace that divides the furnace into a central hot zone and a relatively cool peripheral zone adjacent the outer wall of the furnace. A plurality of vertical strip heating elements are mounted on the inner wall of the heat shields in the hot zone.

A vacuum system is provided for evacuating both zones of the furnace. The outer wall of the furnace includes an inner member and an outer member spaced therefrom to define a water jacket therebetween so that the outer member remains at substantially ambient temperature during the brazing process.

The injector assembly includes a stationary shield tube, for slidably supporting a gettering agent carrier, that is fixed at one end to a flange on the outer wall of the furnace and projects through an aperture in the metal heat shields into the hot zone of the furnace. A cartridge is removably positioned in the cylindrical carrier and the carrier is slidable in the fixed tube by a push rod connected to one end of the carrier that extends outwardly of the furnace through the outer wall flange, and it has an operating handle on the exterior end thereof so the operator may move the carrier and cartridge therein from the hot zone where gettering agent vaporization occurs back to the cool zone where vaporization is prevented. The thermocouple for sensing the magnesium temperature is fixed to the end of the push rod and projects into the carrier and into the magnesium cartridge through an aperture in one end of the cartridge. The thermocouple leads extend through the push rod which is hollow and exit the injector assembly at the exterior end of the push rod. The push rod is sealed in a bushing connected to a tube projecting exteriorly of the guide tube mounting flange on the outer wall of the furnace.

BRIEF DESCRIPTION OF THE DRAWINGS

FIG. 4 is an enlarged longitudinal section of the gettering agent injector assembly;

FIG. 5 is a fragmentary end view of the furnace exterior portion of the injector assembly taken generally along line 5—5 of FIG. 4.

FIG. 6 is a cross-section of the guide tube and carrier-cartridge assembly taken generally along line 6—6 of FIG. 4;

FIG. 7 is a hot zone end view of the injector assembly taken generally along lines 7—7 of FIG. 4;

FIG. 8 is an enlarged longitudinal section taken generally along line 8—8 of FIG. 4, illustrating the injector carrier and associated parts;

FIG. 11 is a longitudinal section illustrating the injector assembly similar to FIG. 4 with the gettering agent carrier moved from the cool zone illustrated in FIG. 4 into the hot zone of the furnace.

DETAILED DESCRIPTION OF THE PREFERRED EMBODIMENT

Figure 1:
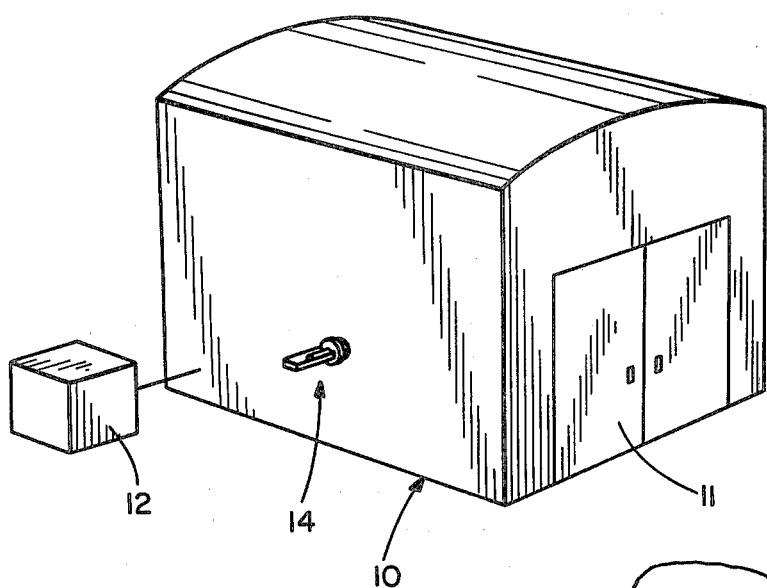
FIG. 1 is a perspective view of a vacuum brazing furnace according to the present invention.

As seen in the drawings and particularly FIGS. 1–4, a large enclosed cold wall brazing furnace 10 is illustrated which is of sufficient size to accommodate large cores for heat exchangers for heavy industrial applications. Walk-through doors 11 provided in the side of the furnace permit the entry and exit of the heat exchange cores prior to and after brazing. An evacuating system 12 is illustrated in FIG. 1 in schematic form, for evacuating the interior of the furnace 10 prior to and during the brazing operation. An injector assembly 14 serves to shift a gettering agent, such as magnesium, from a cool zone of the furnace to a hot zone of the furnace to control vaporization of the magnesium.

As seen in FIG. 4, the furnace 10 has an outer wall assembly including a cold outer shell 15 and an inner shell 16 spaced from the outer shell and defining therebetween a water jacket 17 that maintains the outer shell 15 substantially at ambient temperature during the brazing cycle.

A plurality of heat shields 19 encircle the furnace interior and are spaced approximately 15 inches from the outer walls 15 and 16 and they define a central hot zone 21 and a relatively cool surrounding zone 22 in the furnace interior.

Figure 3:
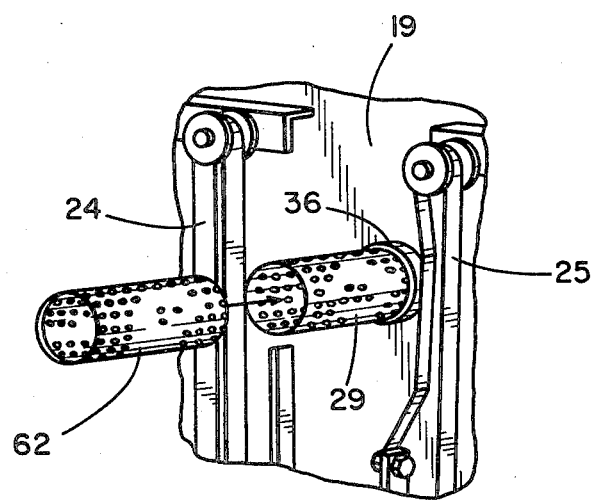
FIG. 3 is a fragmentary perspective view of the interior of the gettering agent injector assembly projecting within the hot zone of the furnace.

As seen in FIGS. 3, 4 and 11, the furnace is heated by a plurality of vertically arranged strip heating elements 24 and 25 supported on the interior or hot zone side of the heat shields 19.

The gettering agent injector assembly 14 includes a horizontally arranged support assembly 26 with a movable slide assembly 28 mounted therein for shifting a gettering agent carrier 29 from the cool zone 22 to the hot zone 21 and withdrawing the carrier from the hot zone to the cool zone.

Injector assembly 26 includes an annular tube 30 welded within a circular aperture in furnace outer wall members 15 and 16 and carries an annular flange 31 at its left end as viewed in FIG. 4 to which a circular closure plate 32 is fixed by threaded fastening elements 34. A carrier guide tube 36 is fixed within a counterbore 37 in plate 32 at its left end and extends through and supported in circular openings 38 in the heat shields 19 at its right end, providing access and support for the carrier 29 between the cool zone 22 and the hot zone 21.

Figure 9:
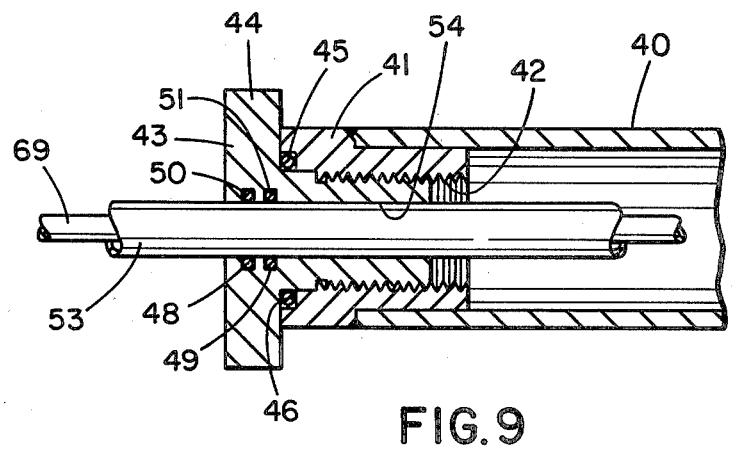
FIG. 9 is a fragmentary longitudinal section taken generally along line 9—9 of FIG. 4 illustrating the sealing arrangement for the injector push rod.

A seal tube 40 is provided, fixed at its right end in counterbore 41 in the outer surface of the closure plate 32, for supporting the carrier assembly 28 and thermally isolating the interior of the injector from the ambient atmosphere surrounding the furnace. As seen in FIG. 9, the seal tube 40 has a stepped annular seal bushing 41 mounted in its left end having a threaded internal bore 42 that receives a threaded stepped push rod bushing 43 having an end flange 44 abutting the projecting end of the bushing 41. An O-ring seal 45 is provided in a counterbore 46 in the end of the bushing 41 abutting the flange 44 to seal the inter-engaging threaded surfaces on the bushings 41 and 43. The seal bushing 43 has spaced annular internal recesses 48 and 49 that receive O-rings 50 and 51 respectively, that sealingly engage carrier push rod 53 to thermally isolate the clearance space between the outer surface of the push rod 53 and central bore 54 in the bushing 43 that slidably receives rod 53.

As seen in FIG. 8, the push rod 53 has a threaded right end 54 that is threadedly received in a rear plate 56 of carrier 29. Rod 53 is axially located therein by a pair of threaded nut elements 58 and 59 on rod 53 that flank the opposite sides of the plate 56 to lock the rod 53 in position with respect to the carrier 29.

Figure 10:
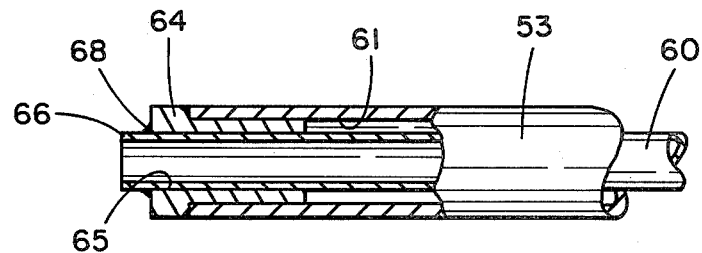
FIG. 10 is a fragmentary longitudinal section taken generally along line 10—10 of FIG. 4 illustrating the construction of the exterior end of the injector push rod.

The push rod 53 has a thermocouple tube 60 fixed therein and spaced from push rod interior surface 61, as seen in FIG. 9. Thermocouple tube 60 has a closed right distal end 61 extending a substantial distance into the carrier 29 and a gettering agent cartridge 62 positioned therein as shown in FIG. 8. The proximal end of the thermocouple tube shown in FIG. 10 is sealed in rod 53 by an annular bushing 64 fixed to the projecting end of the push rod 53 and having a central bore 65 that receives the left end of thermocouple tube 60 which has an end 66 projecting a short distance from the end of the bushing 64 to permit a brazement 68 therearound to seal the space between the push rod 53 and the thermocouple tube 60.

As seen in FIGS. 4 and 5, thermocouple leads 69 are connected to the projecting end 66 of the thermocouple tube 60 and are adapted to be connected to a suitable temperature indicating instrument (not shown) so that the temperature of the gettering agent may be monitored.

A vertical handle member 70 is fixed to the outwardly projecting end of push rod 53 so that the injector carrier assembly 28 may be shifted manually to position the carrier 29 in either the hot zone 21 or the cool zone 22.

Figure 2:
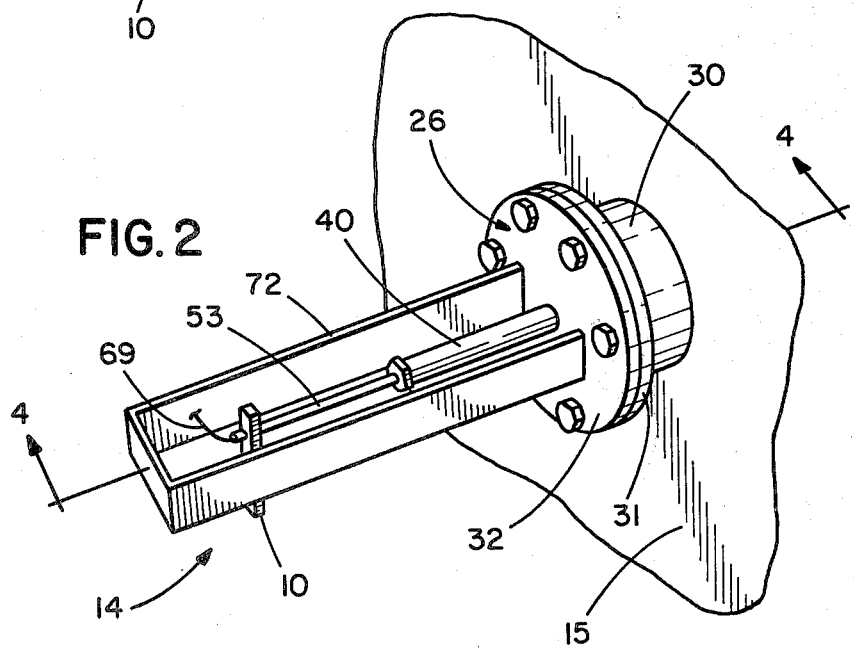
FIG. 2 is a fragmentary perspective view of the furnace showing the exterior of the gettering agent injector assembly according to the present invention.

As seen in FIGS. 2 and 4, U-shaped guard bracket 72 is fixed to the closure plate 32 and surrounds the seal tube 40 and the projecting portion of the push rod 53 and handle 70 to minimize the likelihood of the inadvertent injection of the gettering agent from the cool zone 22 into the hot zone 21.

As seen clearly in FIGS. 6 and 8, the carrier 29 includes a tube member 73 fixed at its right end around the plate 56 and it has a plurality of bores 74 completely around its periphery to freely communicate the environment surrounding the carrier with the carrier interior.

The cartridge 62 is removably positioned within the carrier 29 and includes a cylindrical sleeve 75 having bores 76 throughout its periphery carrying a cylindrical closure plate 78 at one end having a flanged aperture 79 that receives the distal end of the thermocouple tube 60. The right end of the sleeve 75 receives an apertured end member 79 that is removable to permit the addition of gettering agent into the cartridge 75.

In use, the large aluminum assembly is placed in its assembled condition with the brazing alloy in situ in the hot zone of the furnace 21 prior to furnace heating. This assembly may, for example, be a large industrial entirely aluminum plate and fin heat exchange core. The in situ brazing alloy is an aluminum-silicon braze alloy in the form of thin brazing alloy sheets positioned adjacent the joints to be brazed during assembly of the core. The brazing alloy includes a small quantity of magnesium on the order of one percent that performs the major gettering function for the furnace envelope during the brazing of assembly, except that it does not perform the complete gettering function according to the present method during brazing of the external joints on the large core assembly. A plurality of thermocouples are attached to the assembly both on its exterior surface interiorly thereof.

The cartridge 29 with magnesium chips therein is loaded into the cartridge 74 and the cartridge 29 is withdrawn in the guide tube 36 into the cool zone 22.

Thereafter, the evacuation system 12 is energized to initiate the evacuation of the furnace volume and the heating elements 24, 25, etc. are energized to begin the heat up of the hot zone 21 toward the brazing temperature of the assembly.

As the operator monitors the thermocouples on the exterior surface of the assembly being brazed, when they reach a temperature just below the brazing temperature, the operator, by moving handle 70, shifts the cartridge 29 from the cool zone 22 into the hot zone 21. He does this when the surface temperatures of the assembly reach approximately 1,020 degrees Fahrenheit. The time of initial gettering agent vaporization is determined by monitoring the temperature sensed by the thermocouple in the gettering agent cartridge, and this generally occurs at approximately 950 degrees Fahrenheit for magnesium. The operator then times the vaporization of the magnesium to determine the quantity of vapor injected. After a predetermined vaporization of the gettering agent, determined from experience and affected by such parameters as furnace volume, furnace brazing pressure, the quantity of gettering agent in the brazing alloy, and the size of the assembly to be brazed, the operator withdraws the cartridge 29 from the hot zone 21 to the cool zone 22 by withdrawing handle 70. This drops the temperature of the magnesium below its vaporization temperature. The vaporization of the additional magnesium in cartridge 29 is terminated approximately when flow and wetting of the external joints on the assembly has been completed, determined by the operator by monitoring the time the external assembly thermocouple temperatures are at brazing temperature.

This completes the brazing of the external joints, and the internal joints in the assembly are then completed as the internal joints reached the brazing temperature. The furnace is then cooled and the completed assembly removed.

What is claimed is:

1. In the vacuum brazing of large metal assemblies having numerous joints to be brazed both at the surface of the assembly and interiorly of the assembly, in an enclosed furnace the operative steps of; placing the assembly to be brazed in the furnace with a brazing material containing a gettering agent in the area of the joints to be brazed, elevating the temperature of the furnace toward the brazing temperature of the metals to be joined, vaporizing an additional quantity of a gettering agent in the furnace as the temperature of the surface of the assembly approaches the brazing temperature of the metals to be joined to supplement the gettering effect of the gettering agent in the area of the surface of the assembly at that time, and elevating the temperature of the furnace for a time to approach the brazing temperature of the joints interiorly of the assembly so that the gettering agent in the area of the interior joints getters the area adjacent those joints.

2. In the vacuum brazing of metal assemblies with plural joints to be formed in an enclosed furnace having a hot zone and a relatively cool zone, the operative steps of placing the assembly in the hot zone of the furnace in the presence of a brazing material in the area of the joints to be brazed with a gettering agent adjacent the joints to be formed, placing a supplemental gettering agent in the cool zone of the furnace, elevating the furnace temperature toward the brazing temperature of the metals to be joined, moving the supplemental gettering agent from the cool zone to the hot zone to vaporize a portion of the gettering agent to getter the furnace volume, and withdrawing the supplemental gettering agent from the hot zone to the cool zone after wetting and flow of the braze material at least at one of the joints but prior to wetting and flow of all the joints to control the amount of gettering agent vaporized.

3. In the vacuum brazing of metal members in an enclosed furnace having a hot zone and a relatively cool zone, the operative steps as defined in claim 2, wherein the assembly is a large assembly where brazing of the metals to be joined occurs more rapidly at the surface of the assembly than interiorly of the assembly and the brazing material in the area of the joints to be formed also contains a quantity of said gettering agent, wherein said step of moving the supplemental gettering agent from the cool zone to the hot zone occurs at a time when the exterior surface of the assembly reaches a temperature just below the brazing temperature of the metals.

4. In the vacuum brazing of metal members in an enclosed furnace having a hot zone and a relatively cool zone, the operative steps defined in claim 2, wherein the step of moving the gettering agent from the cool zone to the hot zone occurs at a time when the metals to be joined reach a temperature just below the brazing temperature of the metals to be joined.

5. In the vacuum brazing of metal members in an enclosed furnace having a hot zone and a relatively cool zone, the operative steps defined in claim 2, wherein the metals to be joined are aluminum, the brazing material is an aluminum alloy, and the gettering agent is magnesium.

6. In the vacuum brazing of large metal assemblies having numerous joints to be brazed both at the surface of the assembly and interiorly of the assembly, in an enclosed furnace, the operative steps of; placing the assembly to be brazed in the furnace with a brazing material containing a gettering agent in the area of the joints to be brazed, elevating the temperature of the furnace toward and to the brazing temperature of the metals to be joined, vaporizing an additional quantity of gettering agent in the furnace as the temperature of the surface of the assembly approaches the brazing temperature of the metals to be joined to getter the furnace volume, terminating the vaporization of the additional quantity of gettering agent prior to completing brazing of the interior joints and thereafter maintaining the temperature of the furnace for a time to complete brazing the joints at the surface and interiorly of the assembly so that the vaporization of the gettering agent in the brazing material primarily promotes brazing material flow at the joints.

7. In the vacuum brazing of large metal assemblies having numerous joints to be brazed both at the surface of the assembly and interiorly of the surface, in an enclosed furnace, the operative steps defined in claim 6, wherein the furnace has a hot zone in the area of the assembly to be joined and a relatively cool zone, the additional steps of moving the additional gettering agent from the cool zone to the hot zone for vaporization thereof and withdrawing the additional gettering agent from the hot zone to the cool zone to control the amount of gettering agent vaporized.

8. In the vacuum brazing of large metal assemblies having numerous joints to be brazed both at the surface of the assembly and interiorly of the surface, in an enclosed furnace, the operative steps defined in claim 6, wherein the metals to be joined are aluminum, the brazing material is an aluminum alloy, and the gettering agent is magnesium.

9. In the vacuum brazing of aluminum alloy assemblies having several joints to be brazed both at the surface of the assembly and interiorly of the assembly where a brazing alloy containing a small quantity of magnesium is positioned adjacent the joints to be formed, in an enclosed furnace, the operative steps of; placing the aluminum assembly with the brazing alloy in the furnace, elevating the temperature of the furnace toward and to the brazing temperature of the aluminum alloys to be joined beginning vaporization of the magnesium in the brazing alloy, vaporizing a quantity of a gettering agent in the furnace apart from the magnesium in the brazing alloy as the temperature of the surface joints approaches brazing temperature to getter the furnace volume, and terminating the vaporization of the gettering agent prior to completion of brazing the interior joints so that said vaporization of the magnesium in the brazing alloy primarily promotes wetting the surface and interior joints.

10. In the vacuum brazing of aluminum alloy assemblies having several joints to be brazed both at the surface of the assembly and interiorly of the assembly where a brazing alloy containing a small quantity of magnesium is positioned adjacent the joints to be formed, in an enclosed furnace, as defined in claim 9, wherein the gettering agent is also magnesium.

11. In the vacuum brazing of aluminum alloy assemblies having several joints to be brazed both at the surface of the assembly and interiorly of the assembly where a small quantity of magnesium is positioned adjacent the joints to promote wetting and brazing alloy flow during brazing, in an enclosed furnace, the operative steps of; placing the aluminum assembly with the magnesium in situ at the joints in the furnace, elevating the temperature of the furnace toward and to the brazing temperature of the aluminum alloys to be joined beginning the vaporization of the magnesium, vaporizing a quantity of a gettering agent in the furnace, apart from the vaporization of the magnesium in the area of the joints, as the temperature of the surface joints approaches brazing temperature to getter the furnace volume, and terminating the vaporization of gettering agent prior to completion of brazing the internal joints, so that vaporization of the magnesium in the area of the joints primarily promotes wetting the surface and interior joints.

12. In the vacuum brazing of aluminum alloy assemblies having several joints to be brazed both at the surface of the assembly and interiorly of the assembly where a small quantity of magnesium is positioned adjacent the joints to promote wetting and brazing alloy flow during brazing, in an enclosed furnace, as defined in claim 11, wherein the gettering agent is also magnesium.

13. In the vacuum brazing of assemblies having a plurality of joints to be formed in an enclosed furnace, the operative steps of; placing the assembly in the furnace with a brazing alloy and a gettering agent adjacent the area of the joints to be formed, elevating the temperature of the furnace toward and to the brazing temperature of the metals to be joined, vaporizing a supplemental gettering agent in the furnace to getter the furnace volume just prior to any of the joints reaching brazing temperatures, and terminating the vaporization of the supplemental gettering agent approximately as the first joints reach brazing temperature and substantially prior to the completion of brazing all the joints.

14. In the vacuum brazing of assemblies having a plurality of joints to be formed in an enclosed furnace, as defined in claim 13, wherein the vaporization of the supplemental gettering agent is terminated when the first joints to reach brazing temperature being flow.

* * * * *

UNITED STATES PATENT AND TRADEMARK OFFICE
CERTIFICATE OF CORRECTION

PATENT NO. : 4,401,254
DATED      : August 30, 1983
INVENTOR(S) : Vernon N. Tramontini It is certified that error appears in the above-identified patent and that said Letters Patent is hereby corrected as shown below:

Col. 8 (Claim 4) line 1, after "metal" cancel "members" and add----assemblies with plural joints to be formed----.

Col. 8 (Claim 4) line 4, after "moving the" add---supplemental---.

Col. 8 (Claim 5) line 8, after "metal" cancel "members" and add----assemblies with plural joints to be formed----.

Col. 9 (Claim 11), line 25, after "of" insert----the----.

Col. 10 (Claim 13), line 20, change "temperatures" to----temperature----.

Signed and Sealed this

Twelfth Day of June 1984

[SEAL]

Attest:

Attesting Officer

GERALD J. MOSSINGHOFF

Commissioner of Patents and Trademarks